United States Patent
Dong et al.

(10) Patent No.: US 12,182,072 B2
(45) Date of Patent: Dec. 31, 2024

(54) BATCH DELETION METHOD AND APPARATUS FOR CACHE CONTENTS, DEVICE AND READABLE STORAGE MEDIUM

(71) Applicant: ZTE Corporation, Shenzhen (CN)

(72) Inventors: Hong Dong, Shenzhen (CN); Zhi Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 114 days.

(21) Appl. No.: 17/772,314

(22) PCT Filed: Oct. 21, 2020

(86) PCT No.: PCT/CN2020/122504
§ 371 (c)(1),
(2) Date: Apr. 27, 2022

(87) PCT Pub. No.: WO2021/083005
PCT Pub. Date: May 6, 2021

(65) Prior Publication Data
US 2022/0405244 A1    Dec. 22, 2022

(30) Foreign Application Priority Data
Oct. 28, 2019   (CN) .......................... 201911033721.1

(51) Int. Cl.
*G06F 16/172* (2019.01)
*G06F 16/14* (2019.01)
(Continued)

(52) U.S. Cl.
CPC .......... *G06F 16/172* (2019.01); *G06F 16/148* (2019.01); *G06F 16/162* (2019.01); *G06F 16/182* (2019.01)

(58) Field of Classification Search
CPC .... G06F 16/172; G06F 16/162; G06F 16/182; G06F 16/148; G06F 12/0815; H04L 67/28
(Continued)

(56) References Cited

U.S. PATENT DOCUMENTS 7,711,788 B2 * 5/2010 Lev Ran ................... H04L 9/40
  709/213
8,533,767 B1 * 9/2013 Tsang ................. H04N 21/8133
  725/143
(Continued)

FOREIGN PATENT DOCUMENTS

CN    104331257 A    2/2015
CN    105915619 A    8/2016
(Continued)

OTHER PUBLICATIONS

International Searching Authority. International Search Report and Written Opinion for PCT Application No. PCT/CN2020/122504 and English translation, mailed Jan. 11, 2021, pp. 1-9.
(Continued)

*Primary Examiner* — Hanh B Thai
(74) *Attorney, Agent, or Firm* — Vivacqua Crane, PLLC

(57) ABSTRACT

A batch deletion method, apparatus, and device for cached content and a non-transitory computer-readable storage medium are disclosed. The method may include: adding keywords to content identifiers which correspond to cached resources (S101); saving the content identifiers separately (S102); finding, through a keyword-based query, content identifiers meeting at least one condition (S103); locating storage paths of cached resources by using the content identifiers meeting the at least one condition (S104); and deleting the located cached resources one by one (S105).

14 Claims, 5 Drawing Sheets

(51) Int. Cl.
*G06F 16/16* (2019.01)
*G06F 16/182* (2019.01)

(58) Field of Classification Search
USPC .......................................................... 707/827
See application file for complete search history.

(56) References Cited

U.S. PATENT DOCUMENTS

| | | | | |
|---|---|---|---|---|
| 8,862,602 | B1* | 10/2014 | Sisson | G06F 16/9566 |
| | | | | 707/756 |
| 8,943,401 | B2* | 1/2015 | Martinez | G06Q 30/02 |
| | | | | 705/14.69 |
| 9,009,267 | B2* | 4/2015 | Sherman | H04L 63/14 |
| | | | | 709/224 |
| 9,135,348 | B2* | 9/2015 | Wu | G06F 16/337 |
| 9,898,477 | B1* | 2/2018 | Panghal | G06F 16/182 |
| 10,198,513 | B2* | 2/2019 | Denninghoff | H03H 9/25 |
| 10,452,619 | B1* | 10/2019 | Panghal | G06F 16/178 |
| 11,106,386 | B1* | 8/2021 | Sun | G06F 16/2455 |
| 11,113,244 | B1* | 9/2021 | Chen | G06F 16/1744 |
| 11,386,060 | B1* | 7/2022 | Schmitt | G06F 3/0689 |
| 11,429,634 | B2* | 8/2022 | Koorapati | G06F 16/176 |
| 2001/0034771 | A1* | 10/2001 | Hutsch | H04L 67/567 |
| | | | | 709/217 |
| 2002/0199013 | A1* | 12/2002 | Sorensen | H04L 9/40 |
| | | | | 709/236 |
| 2003/0018621 | A1 | 1/2003 | Steiner et al. | |
| 2004/0249790 | A1* | 12/2004 | Komamura | G06F 16/3322 |
| 2005/0172080 | A1* | 8/2005 | Miyauchi | G06F 12/121 |
| | | | | 711/119 |
| 2005/0177560 | A1* | 8/2005 | Morioka | G06Q 10/00 |
| 2006/0085519 | A1* | 4/2006 | Goode | H04L 67/5682 |
| | | | | 709/218 |
| 2006/0159109 | A1* | 7/2006 | Lamkin | H04L 67/10 |
| | | | | 707/E17.032 |
| 2008/0010365 | A1* | 1/2008 | Schneider | H04L 63/10 |
| | | | | 709/223 |
| 2008/0034097 | A1* | 2/2008 | Nomura | H04L 61/00 |
| | | | | 709/227 |
| 2008/0082405 | A1* | 4/2008 | Martinez | G06Q 30/00 |
| | | | | 705/14.1 |
| 2010/0169392 | A1* | 7/2010 | Lev Ran | H04L 67/06 |
| | | | | 707/827 |
| 2010/0251086 | A1* | 9/2010 | Haumont | G06F 40/134 |
| | | | | 715/255 |
| 2011/0066676 | A1* | 3/2011 | Kleyzit | H04L 67/289 |
| | | | | 709/203 |
| 2012/0158763 | A1 | 6/2012 | Meijer | |
| 2012/0191804 | A1* | 7/2012 | Wright | H04L 67/02 |
| | | | | 709/217 |
| 2013/0007228 | A1* | 1/2013 | Sherman | G06F 16/958 |
| | | | | 709/219 |
| 2013/0297662 | A1* | 11/2013 | Sharma | H04W 12/08 |
| | | | | 707/827 |
| 2014/0108474 | A1* | 4/2014 | David | H04L 67/568 |
| | | | | 707/827 |
| 2014/0149794 | A1* | 5/2014 | Shetty | G06F 16/951 |
| | | | | 709/213 |
| 2014/0164352 | A1* | 6/2014 | Denninghoff | G06F 16/954 |
| | | | | 707/711 |
| 2014/0279854 | A1 | 9/2014 | Scanlon et al. | |
| 2014/0337461 | A1* | 11/2014 | Lipstone | H04L 43/04 |
| | | | | 709/213 |
| 2014/0344425 | A1* | 11/2014 | Varney | H04L 41/0813 |
| | | | | 709/221 |
| 2015/0019674 | A1* | 1/2015 | Le Van Gong | H04L 43/045 |
| | | | | 709/213 |
| 2015/0088964 | A1* | 3/2015 | Shiell | G06F 12/126 |
| | | | | 709/203 |
| 2015/0134768 | A1* | 5/2015 | Yishai | H04L 67/02 |
| | | | | 709/213 |
| 2016/0241670 | A1* | 8/2016 | Shiell | H04L 43/106 |
| 2016/0261704 | A1* | 9/2016 | Le Van Gong | H04L 67/5682 |
| 2017/0220469 | A1* | 8/2017 | Deliot | G06F 12/0891 |
| 2017/0286159 | A1* | 10/2017 | Thiruvengadachari | |
| | | | | G06F 9/4881 |
| 2017/0310752 | A1* | 10/2017 | Knothe | H04L 67/55 |
| 2018/0189311 | A1* | 7/2018 | Newhouse | G06F 21/52 |
| 2019/0123924 | A1* | 4/2019 | Embiricos | H04L 12/1813 |
| 2019/0124169 | A1* | 4/2019 | Sundin | H04L 67/535 |
| 2019/0205050 | A1* | 7/2019 | Koorapati | G06F 16/122 |
| 2019/0205417 | A1* | 7/2019 | Lai | G06F 16/1787 |
| 2019/0220367 | A1* | 7/2019 | Visvanathan et al. | |
| 2019/0294659 | A1* | 9/2019 | Sethi | G06Q 10/101 |
| 2019/0332687 | A1* | 10/2019 | Wilf | G06F 40/169 |
| 2022/0075782 | A1* | 3/2022 | Hines | G06F 16/211 |
| 2022/0283957 | A1* | 9/2022 | Ma | G06F 12/128 |

FOREIGN PATENT DOCUMENTS

| | | |
|---|---|---|
| CN | 107943387 A | 4/2018 |
| CN | 109976668 A | 7/2019 |

OTHER PUBLICATIONS

European Patent Office. Extended European Search Report for EP Application No. 20882205.6, mailed Oct. 28, 2022, pp. 1-9.

The State Intellectual Property Office of People's Republic of China. First Office Action for CN Application No. 201911033721.1 and English translation, mailed Sep. 27, 2023, pp. 1-10.

The State Intellectual Property Office of People's Republic of China. First Search Report for CN Application No. 201911033721.1 and English translation, mailed Sep. 25, 2023, pp. 1-6.

* cited by examiner

BATCH DELETION METHOD AND APPARATUS FOR CACHE CONTENTS, DEVICE AND READABLE STORAGE MEDIUM

CROSS-REFERENCE TO RELATED APPLICATION

This application is a national stage filing under 35 U.S.C. § 371 of international application number PCT/CN2020/122504, filed on Oct. 21, 2020, which claims priority to Chinese patent application No. 201911033721.1 filed on Oct. 28, 2019. The contents of these applications are incorporated herein by reference in their entirety.

TECHNICAL FIELD

Embodiments of the present disclosure relate to but are not limited to the field of content delivery network (CDN) application for the Internet, and in particular, relate to but are not limited to a batch deletion method, apparatus, and device for cached content and a non-transitory computer-readable storage medium.

BACKGROUND

During operation and maintenance for a CDN, batch deletion of cached content is required in some scenarios, which are specifically described as follows. Scenario One: A cooperative content provider (CP) requires batch removal of content from both the CDN and its source site, for example, all resources for a specific video website, Hong Kong and Taiwan movie resources in a movie category for a specific video website, and resources launched on Jun. 5, 2019 for a specific video website. Scenario Two: To achieve economic benefits and improve resource utilization, the CDN is expected to cache high-value and popular content and clear less popular content in batches to free up disk space. Scenario Three: For social benefits, batch deletion of sensitive or unsafe and risky resources is required during major national conferences or important holidays.

A CDN server constructed based on NGINX, as shown in FIG. 6, supports only a narrow range of content deletion functions and does not support timely batch deletion of content with some common characteristics. This makes it difficult to implement deletion in some scenarios. In these scenarios, it is often necessary to obtain accurate and complete uniform resource locators (URL) in order to delete corresponding resources, which is inefficient. If a platform includes sensitive or unsafe resources, a server disk has to be formatted and thus all content has to be re-cached, causing a serious waste of resources. For the above-mentioned problems in some cases, it's important to propose a CDN-applicable batch deletion method for cached content which enables deletion of specified content and batch deletion.

SUMMARY

The embodiments of the present disclosure provide a batch deletion method, apparatus, and device for cached content, and a non-transitory computer-readable storage medium to solve the following technical problems at least to a certain extent: in some cases, a CDN server constructed based on NGINX supports only a narrow range of content deletion functions and does not support timely batch deletion of content with some common characteristics, and consequently, efficiency is extremely low when batch deletion is required; and in some cases, if a platform includes sensitive or unsafe resources, a server disk has to be formatted and thus all content has to be re-cached, causing a waste of resources.

In view of this, an embodiment of the present disclosure provides a batch deletion method for cached resources, which may include: adding keywords to content identifiers which correspond to cached resources; saving the content identifiers separately; finding, through a keyword-based query, content identifiers meeting at least one condition; locating paths of cached resources by using the content identifiers meeting the at least one condition; and deleting the located cached resources one by one.

An embodiment of the present disclosure further provides a batch deletion apparatus for cached resources, which may include: a file storage module configured to store cached resources; a content caching module configured to add keywords to content identifiers which correspond to the cached resources; a content identifier storage module configured to save the content identifiers separately; a content identifier batch search module configured to find, through a keyword-based query, content identifiers meeting at least one condition, and locate paths of cached resources by using the content identifiers meeting the at least one condition; and a content deletion module configured to delete the located cached resources one by one.

An embodiment of the present disclosure further provides a batch deletion device for cached resources, which may include a processor, a memory, and a communication bus, where the communication bus is configured to connect a first processor and a first memory; and the processor is configured to execute one or more computer programs stored in the memory to implement steps of the batch deletion method for cached resources in any above embodiment.

An embodiment of the present disclosure further provides a non-transitory computer-readable storage medium storing one or more computer programs executable by one or more processors to implement steps of the batch deletion method for cached resources in any above embodiment.

Other features and corresponding beneficial effects of the present disclosure are explained in the subsequent description, and it should be understood that at least some of the beneficial effects become apparent from the description of the present disclosure.

DETAILED DESCRIPTION

In order to make the objective, technical schemes and advantages of the present disclosure more clearly understood, the embodiments of the present disclosure will be further illustrated in detail by means of specific embodiments in conjunction with the accompanying drawings. It should be understood that the specific embodiments described here are intended only to explain the present disclosure and are not intended to limit the present disclosure.

Example Embodiment I

Figure 1:
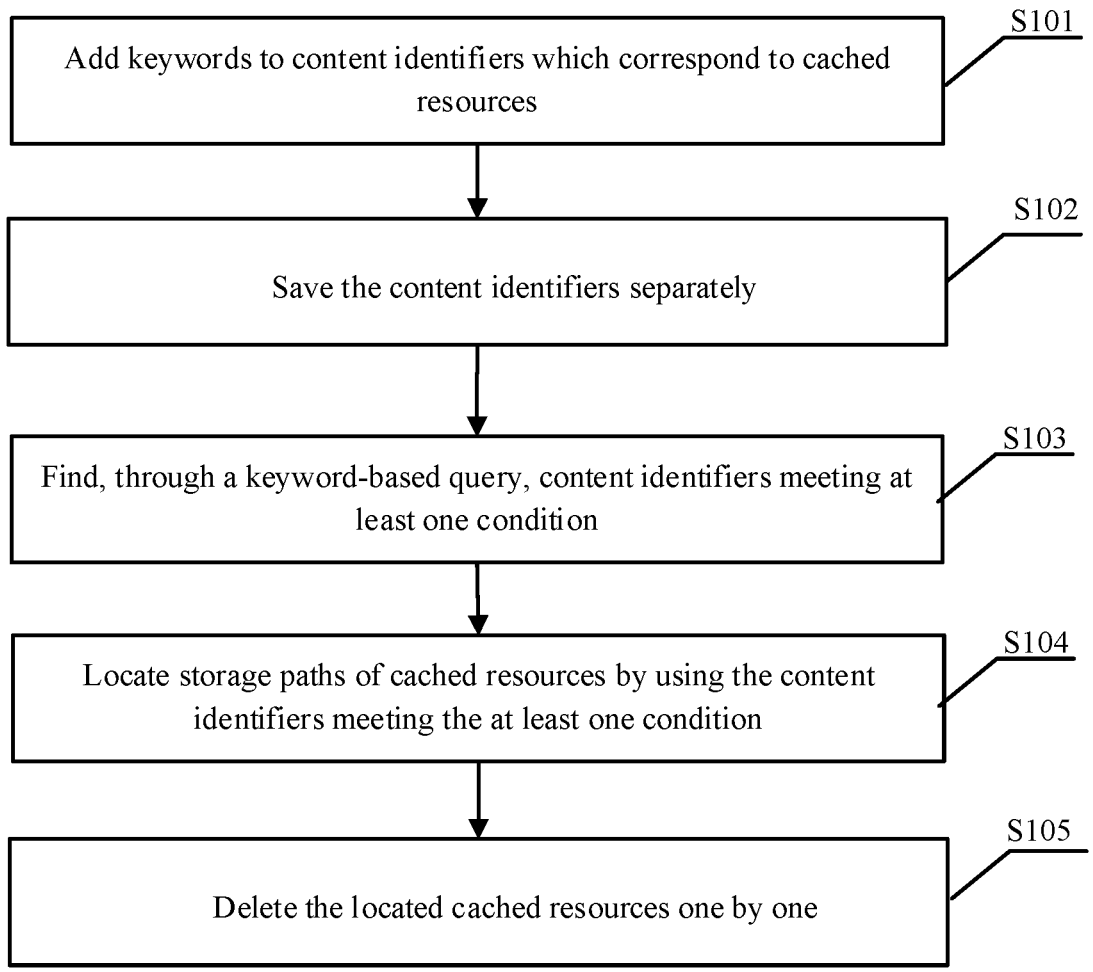
FIG. 1 is a flowchart of a batch deletion method for cached resources in example embodiment I of the present disclosure.

This embodiment is intended to at least solve the following problems to a certain extent: in some cases, a CDN server constructed based on NGINX supports only a narrow range of content deletion functions and does not support timely batch deletion of content with some common characteristics, and consequently, efficiency is extremely low when batch deletion is required; and in some cases, if a platform includes sensitive or unsafe resources, a server disk has to be formatted and thus all content has to be re-cached, causing a waste of resources. This embodiment provides a batch deletion method for cached resources, as shown in FIG. 1, including the following steps.

At S101, keywords are added to content identifiers which correspond to cached resources.

In this step, each cached resource has its corresponding content identifier which includes a unique identifier corresponding to the cached resource. The unique identifier is a file name or an identifier with a uniform resource identifier (URI) part of a parameter removed and using a filekey part. For example, for the parameter: https://www.baidu.com/qq_32595453/article/details/79516787, a URI part is removed and the remaining part, /qq_32595453/article/details/79516787, is a unique identifier of the resource.

Keywords are added to the content identifiers to form content identifiers in specific formats. Keywords include a CP, a domain name of the CP, a column, a time, a web site risk level, cached resource popularity, and the like. The content identifiers include at least one of the above keywords. There are two classification manners: static classification and dynamic classification that are performed according to types of the keywords.

Static classification includes the following types:

(1) Classification by the CP: A belonging CP can be identified by accessing a domain name. This classification can cover all resources under the CP. An identifier of the CP is added to the content identifier during caching.

(2) Classification by the domain name of the CP: Generally, a large CP has multiple domain names used to distinguish between different services. The domain name is added to the content identifier during caching.

(3) Classification by column: This classification is mainly performed with reference to column categorization on a current website, for example, TV series, movies and other large columns on a video website, as well as segmented columns under the large column, for example, Hong Kong and Taiwan movies, mainland China movies, and European and American movies under the movie column. A column identifier is added to the content identifier during caching.

(4) Classification by time: Identification is realized by using a resource launch time in a resource URL. This classification depends on time information, for example, time information in a video URL, included in the URL in a website resource. The resource launch time information or the like is added to the content identifier during caching.

Dynamic classification includes the following types:

(1) Classification by the website risk level: First, classification is performed according to an IP home area of a source site. For example, a website in a disturbed area or a foreign website has a relatively high risk level, and is classified into high-risk websites. The IP home area can be obtained from a global IP address database. Classification is then performed according to a type of a website. For example, a website with website information not existing in an ICP filing website is classified into high-risk websites. The website information can be obtained by HTTP message interaction. The information is dynamically obtained and updated regularly during an actual retrieval process, and finally a risk identifier is given to each cached content.

Optionally, website levels may alternatively be identified and classified by manually adding risk levels.

Optionally, risk levels of the website are divided into five levels, with level 5 being the highest risk level and level 1 being the lowest risk level.

(2) Classification by popularity: Statistics are collected for popularity of the cached resources. For example, the cached resources are classified into resources with three-day popularity, weekly popularity, and biweekly popularity. If corresponding duration is not reached for a resource, there is no statistical value for the resource. As a popularity value is updated in real time, a popularity value in the content identifier is also updated in real time.

Optionally, popularity values for the cached resources are divided into five levels, level 5 being the most popular and level 1 being the most unpopular. A correspondence relationship between a level and a resource access frequency may also be manually configured.

At S102, the content identifiers are saved separately.

In this step, specifically, the content identifiers may be saved separately from the cached resources. A format of the content identifier is as follows: CPHdomain name of the CP||column||time||website risk level||cached resource popularity. For example, in the following format cpid=xxvideo||domain=xx.com||column=movie||time=2019/1/2||filekey=/abc/123/xxx.mp4||ala rm=1||hotrate=5, cpid represents the CP, domain represents a domain name of the CP; column represents a column; time represents a time, which is specifically a resource launch time; filekey represents a unique identifier of the cached resource; alarm represents a risk level of a source website for the resource; and hotrate represents popularity of the resource. The example content identifier represents a cached resource from the xx video supplier, with the domain name of xx.com, the column of movies, the launch time of Jan. 2, 2019, the unique resource identifier of/abc/123/xxx.mp4, the risk level of 1, and resource popularity of level 5.

At S103, content identifiers meeting at least one condition are found through a keyword-based query.

In this step, specifically, the parts, meeting at least one condition, of the separately stored content identifiers may be found through a keyword-based query after the keyword(s) is/are obtained. It should be understood that a keyword-based query may refer to a query for content identifiers matching only one specific keyword, or a query based on a plurality of keywords combined to obtain content identifiers meeting a combination of conditions.

At S104, storage paths of cached resources are located by using the content identifiers meeting the at least one condition.

In this step, specifically, the storage path of a cached resource may be located according to partial data of the content identifier. During caching resources, md5 is calculated by using the content identifier from which alarm and hotrate parts are removed, and a path of the cached resource is planned according to an md5 value. The path of the cached resource is planned according to the md5 value, which ensures uniqueness of the path of the cached resource, and also enables the content identifier to have a function of obtaining a location of the cached resource.

At S105, the located cached resources are deleted one by one.

In this step, specifically, the located cached resources may be single-deleted recursively until all the located cached resources are deleted. The CDN server constructed based on NGINX supports single content deletion, so the single content deletion method can be invoked recursively to realize batch deletion of the located cached resources.

After deleting the located cached resources, the content identifiers which correspond to the deleted cached resources are also deleted.

This embodiment has provided a batch deletion method for cached resources, including adding keywords to content identifiers which correspond to the cached resources and saving the content identifiers separately; when it is necessary to delete particular cached resources, finding, through a keyword-based query, content identifiers meeting at least one condition; and locating storage paths of cached resources by using the content identifiers meeting the at least one condition, and deleting the cached resources one by one by recursively invoking the single content deletion method. The batch deletion method for cached resources is intended to at least solve the following problems to a certain extent: in some cases, the CDN server constructed based on NGINX supports only a narrow range of content deletion functions and does not support timely batch deletion of content with some common characteristics, and consequently, efficiency is extremely low when batch deletion is required; and in some cases, if the platform includes sensitive or unsafe resources, a server disk has to be formatted and thus all content has to be re-cached, causing a waste of resources. The method realizes batch deletion of cached content in the CDN server with customized deletion conditions.

Example Embodiment II

Figure 2:
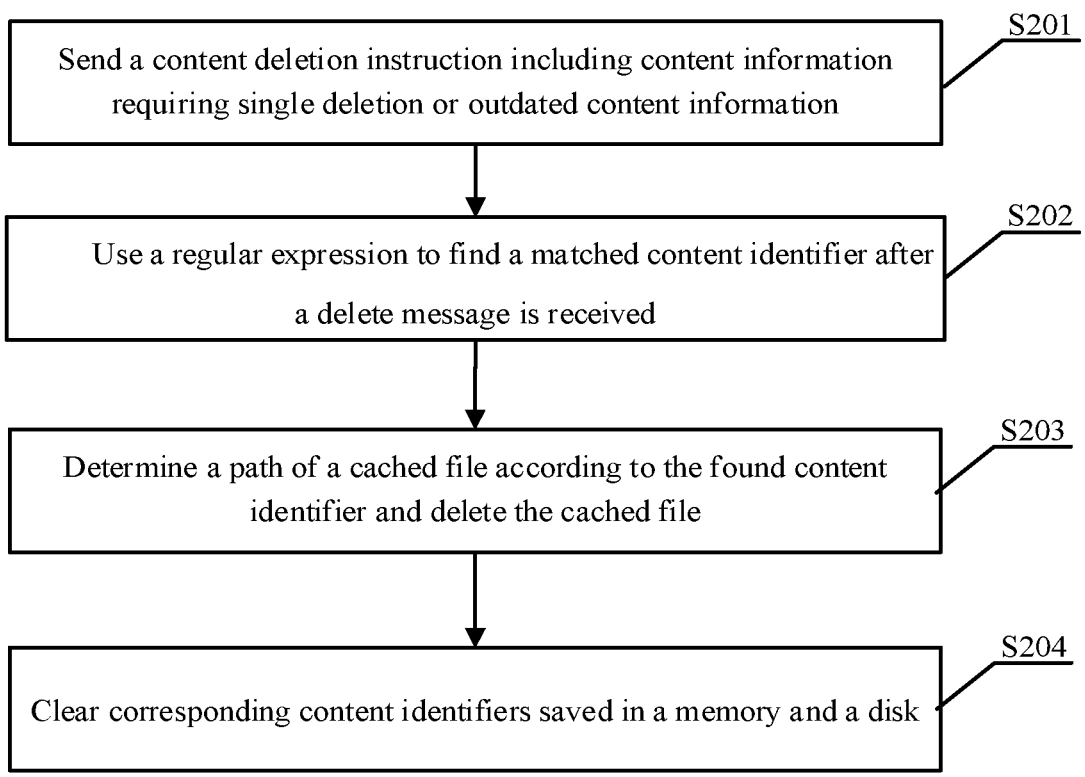
FIG. 2 is a flowchart of a batch deletion method for cached resources in a process of outdated content and single content deletion in example embodiment II of the present disclosure.

This embodiment is intended to at least solve the following problems to a certain extent: in some cases, a CDN server constructed based on NGINX supports only a narrow range of content deletion functions and does not support timely batch deletion of content with some common characteristics, and consequently, efficiency is extremely low when batch deletion is required; and in some cases, if a platform includes sensitive or unsafe resources, a server disk has to be formatted and thus all content has to be re-cached, causing a waste of resources. This embodiment provides a batch deletion method for cached resources. To better understand the content of this embodiment, a batch deletion method for cached resources in a process of outdated content and single content deletion is used as an example herein for illustration. As shown in FIG. 2, the method includes the following steps:

At S201, a content deletion instruction including content information requiring single deletion or outdated content information is sent.

In this step, a unique identifier of a cached resource that needs to be deleted may be set in the instruction to match the corresponding cached resource.

At S202, a regular expression is used to find a matched content identifier after a delete message is received.

At S203, a path of a cached file is determined according to the found content identifier and the cached file is deleted.

In this step, specifically, the storage path of a cached resource may be located according to partial data of the content identifier. During caching resources, md5 is calculated by using the content identifier from which alarm and hotrate parts are removed, and a path of the cached resource is planned according to an md5 value. The path of the cached resource is planned according to the md5 value, which ensures uniqueness of the path of the cached resource, and also enables the content identifier to have a function of obtaining a location of the cached resource.

At S204, corresponding content identifiers saved in a memory and a disk are cleared.

This embodiment has provided a batch deletion method for cached resources. When specified cached resources need to be deleted, content identifiers meeting at least one condition are found through a keyword-based query; storage paths of cached resources are located by using the content identifiers meeting the at least one condition; and the located cached resources are deleted. This realizes customized deletion of cached content in the CDN server and improves deletion efficiency.

Example Embodiment III

Figure 3:
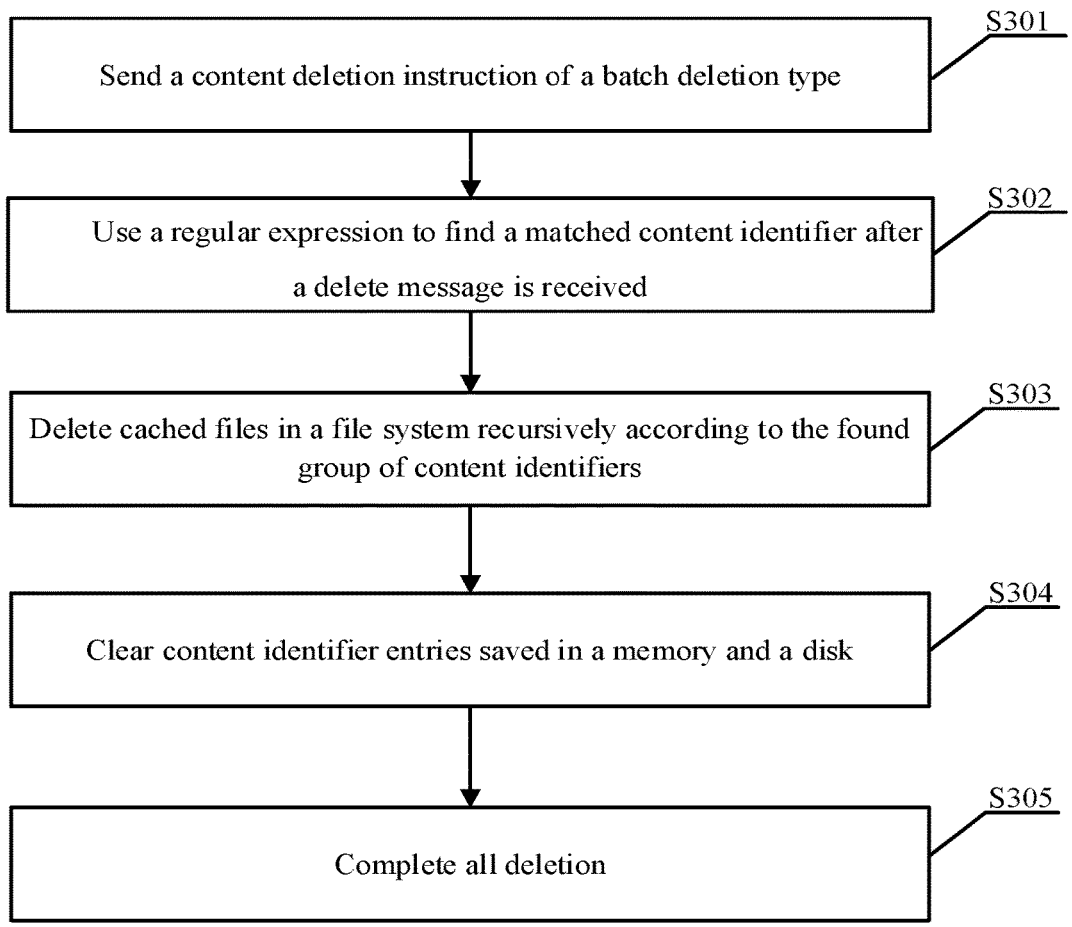
FIG. 3 is a flowchart of a batch deletion method for specific content in example embodiment III of the present disclosure.

This embodiment is intended to at least solve the following problems to a certain extent: in some cases, a CDN server constructed based on NGINX supports only a narrow range of content deletion functions and does not support timely batch deletion of content with some common characteristics, and consequently, efficiency is extremely low when batch deletion is required; and in some cases, if a platform includes sensitive or unsafe resources, a server disk has to be formatted and thus all content has to be re-cached, causing a waste of resources. This embodiment provides a batch deletion method for cached resources. To better understand the content of this embodiment, a batch deletion method for specific content is used as an example herein for illustration. As shown in FIG. 3, the method includes the following steps:

At S301, a content deletion instruction of a batch deletion type is sent.

In this step, batch deletion of different content corresponds to different matching rules. For example, during batch deletion of cached resources with a popularity level of 1, a matching rule is ^.*\|\|hotrate=1$; during batch deletion of cached resources with a risk level of 5, a matching rule is ^.*\|\|alarm=5\|\|*$.

At S302, a regular expression is used to find a matched content identifier after a delete message is received.

At S303, cached files in a file system are deleted recursively according to the found group of content identifiers.

In this step, specifically, storage paths of cached resources may be located by using corresponding data of the content identifiers according to the matching rule in the instruction. During caching resources, md5 is calculated by using the content identifier from which alarm and hotrate parts are removed, and a path of the cached resource is planned according to an md5 value. The path of the cached resource is planned according to the md5 value, which ensures uniqueness of the path of the cached resource, and also enables the content identifier to have a function of obtaining a location of the cached resource.

After the cached resource is located, the located cached resources are single-deleted recursively until all the located cached resources are deleted. The CDN server constructed based on NGINX supports single content deletion, so the single content deletion method can be invoked recursively to realize batch deletion of the located cached resources.

At S304, content identifier entries saved in a memory and a disk are cleared.

In this step, each time one cached resource is deleted, its corresponding content identifier is deleted.

At S305, all deletion is completed.

This embodiment has provided a batch deletion method for cached resources. When specified cached resources need to be deleted, a batch deletion instruction including matching rules is sent. The regular expression is used to find matched content identifiers, and the storage paths of cached resources are located by using the matched content identifiers. Then the located cached resources are single-deleted recursively. The method realizes batch deletion of cached content in the CDN server with customized deletion conditions.

Example Embodiment IV

Figure 4:
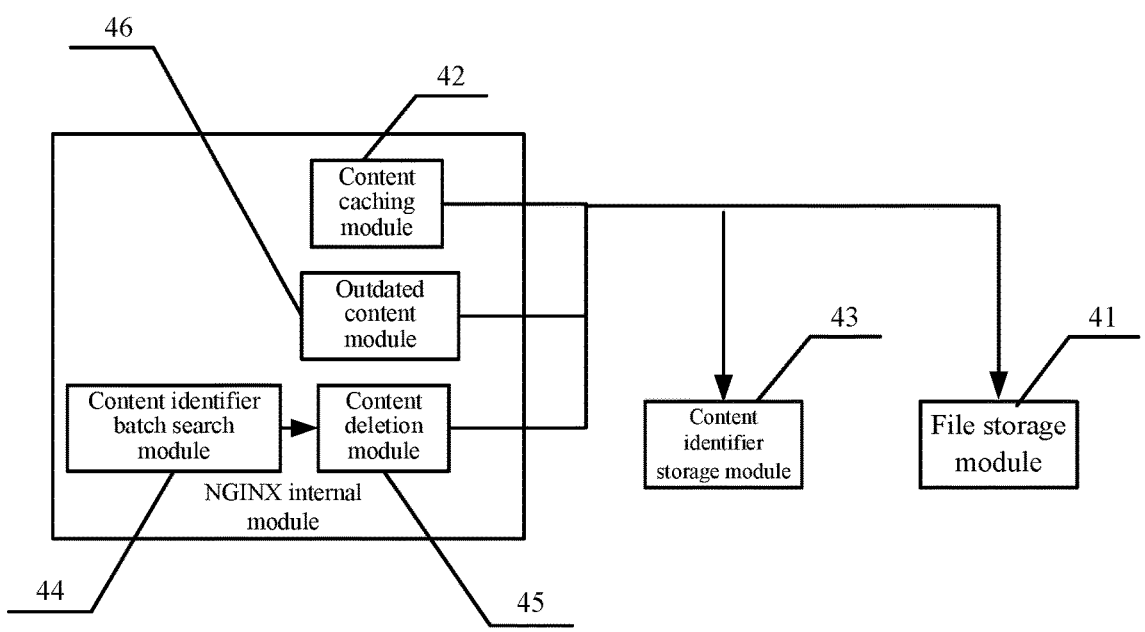
FIG. 4 is a schematic diagram of a batch deletion apparatus for cached resources in example embodiment IV of the present disclosure.
Figure 5:
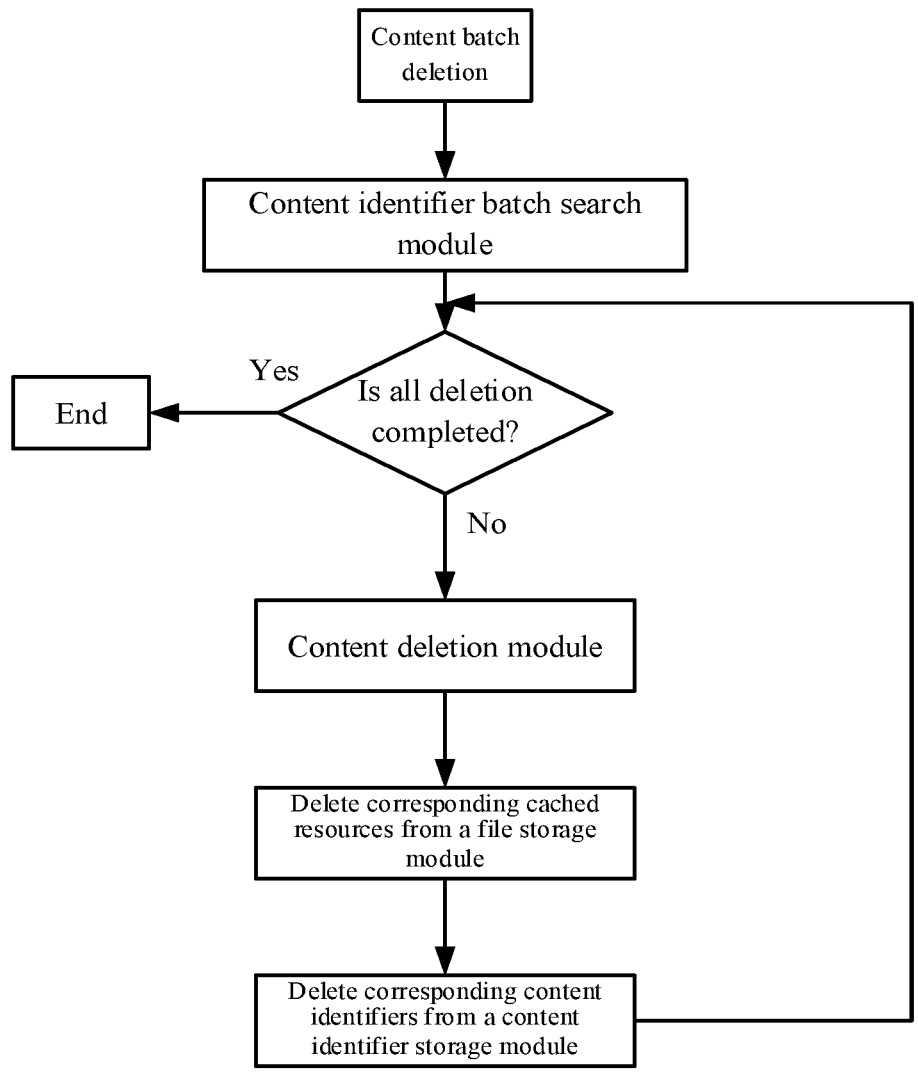
FIG. 5 is an execution flowchart for functional modules in the batch deletion apparatus for cached resources in example embodiment IV of the present disclosure.

This embodiment is intended to at least solve the following problems to a certain extent: in some cases, a CDN server constructed based on NGINX supports only a narrow range of content deletion functions and does not support timely batch deletion of content with some common characteristics, and consequently, efficiency is extremely low when batch deletion is required; and in some cases, if a platform includes sensitive or unsafe resources, a server disk has to be formatted and thus all content has to be re-cached, causing a waste of resources. This embodiment provides a batch deletion apparatus for cached resources, as shown in FIG. 4, including a file storage module 41, a content caching module 42, a content identifier storage module 43, a content identifier batch search module 44, and a content deletion module 45. A flowchart of function execution of the modules is shown in FIG. 5.

The file storage module 41 is configured to store cached resources.

The content caching module 42 is configured to add keywords to content identifiers which correspond to the cached resources.

The cached resources each have its corresponding content identifier, and the content identifier includes a unique identifier corresponding to the cached resource. The unique identifier is a file name or an identifier with a URI part of a parameter removed and using a filekey part. For example, for the parameter: https://www.baidu.com/qq_32595453/article/details/79516787, a URI part is removed and the remaining part, /qq_32595453/article/details/79516787, is a unique identifier of the resource.

Keywords are added to the content identifiers to form content identifiers in specific formats. Keywords include a CP, a domain name of the CP, a column, a time, a website risk level, cached resource popularity, and the like. The content identifiers include at least one of the above keywords. There are two classification manners: static classification and dynamic classification that are performed according to types of the keywords.

Static classification includes the following types:

(1) Classification by the CP: A belonging CP can be identified by accessing a domain name. This classification can cover all resources under the CP. An identifier of the CP is added to the content identifier during caching.

(2) Classification by the domain name of the CP: Generally, a large CP has multiple domain names used to distinguish between different services. The domain name is added to the content identifier during caching.

(3) Classification by column: This classification is mainly performed with reference to column categorization on a current website, for example, TV series, movies and other large columns on a video website, as well as segmented columns under the large column, for example, Hong Kong and Taiwan movies, mainland China movies, and European and American movies under the movie column. A column identifier is added to the content identifier during caching.

(4) Classification by time: Identification is realized by using a resource launch time in a resource URL. This classification depends on time information, for example, time information in a video URL, included in the URL in a website resource. The resource launch time information or the like is added to the content identifier during caching.

Dynamic classification includes the following types:

(1) Classification by the website risk level: First, classification is performed according to an IP home area of a source site. For example, a website in a disturbed area or a foreign website has a relatively high risk level, and is classified into high-risk websites. The IP home area can be obtained from a global IP address database. Classification is then performed according to a type of a website. For example, a website with website information not existing in an ICP filing website is classified into high-risk websites. The website information can be obtained by HTTP message interaction. The information is dynamically obtained and updated regularly during an actual retrieval process, and finally a risk identifier is given to each cached content.

Optionally, website levels may alternatively be identified and classified by manually adding risk levels.

Optionally, risk levels of the website are divided into five levels, with level 5 being the highest risk level and level 1 being the lowest risk level.

(2) Classification by popularity: Statistics are collected for popularity of the cached resources. For example, the cached resources are classified into resources with three-day popularity, weekly popularity, and biweekly popularity. If corresponding duration is not reached for a resource, there is no statistical value for the resource. As a popularity value is updated in real time, a popularity value in the content identifier is also updated in real time.

Optionally, popularity values for the cached resources are divided into five levels, level 5 being the most popular and level 1 being the most unpopular. A correspondence relationship between a level and a resource access frequency may also be manually configured.

The content identifier storage module 43 is configured to save the content identifiers separately. The content identifier is stored in the disk and stored separately from the cached resource. A format of the content identifier is as follows: CP||domain name of the CP||column||time||website risk level||cached resource popularity. For example, in the following format cpid=xxvideo||domain=xx.com||column=movie||time=2019/1/2||filekey=/abc/123/xxx.mp4||alarm=1||hotrate=5, cpid represents the CP;

domain represents a domain name of the CP; column represents a column; time represents a time, which is specifically a resource launch time; filekey represents a unique identifier of the cached resource; alarm represents a risk level of a source website for the resource; and hotrate represents popularity of the resource. The example content identifier represents a cached resource from the xx video supplier, with the domain name of xx.com, the column of movies, the launch time of Jan. 2, 2019, the unique resource identifier of/abc/123/xxx.mp4, the risk level of 1, and resource popularity of level 5.

The content identifier batch search module 44 is configured to find, through a keyword-based query, content identifiers meeting at least one condition, and locate paths of cached resources by using the content identifiers meeting the at least one condition. After obtaining the keywords, the content identifier batch search module 44 finds the parts, meeting at least one condition, of the separately stored content identifiers through a keyword-based query. It should be understood that a keyword-based query may refer to a query for content identifiers matching only one specific keyword, or a query based on a plurality of keywords combined to obtain content identifiers meeting a combination of conditions. A storage path of the cached resource can be located according to partial data of the content identifier. During caching resources, md5 is calculated by using the content identifier from which alarm and hotrate parts are removed, and a path of the cached resource is planned according to an md5 value. The path of the cached resource is planned according to the md5 value, which ensures uniqueness of the path of the cached resource, and also enables the content identifier to have a function of obtaining a location of the cached resource.

The content deletion module 45 is configured to delete the located cached resources from the file storage module 41 one by one. The content deletion module 45 is invoked recursively until all the located cached resources are deleted. After deleting the located cached resources, the content identifiers which correspond to the deleted cached resources in the content identifier storage module 43 are also deleted.

Optionally, the batch deletion apparatus for cached resources in this embodiment further includes an outdated content module 46 configured to select outdated content for deletion.

This embodiment has provided a batch deletion apparatus for cached resources including the file storage module, the content caching module, the content identifier storage module, the content identifier batch search module, and the content deletion module. The content caching module adds the keywords to the content identifiers which correspond to the cached resources. The content identifier storage module saves the content identifiers separately. When needing to delete specified cached resources, the content identifier batch search module finds the content identifiers meeting at least one condition through a keyword-based query, and uses the content identifiers meeting the at least one condition to locate the storage paths of the cached resources. The content deletion module is invoked recursively to delete the located cached resources one by one. The batch deletion apparatus for cached resources is intended to at least solve the following problems to a certain extent: in some cases, the CDN server constructed based on NGINX supports only a narrow range of content deletion functions and does not support timely batch deletion of content with some common characteristics, and consequently, efficiency is extremely low when batch deletion is required; and in some cases, if the platform includes sensitive or unsafe resources, a server disk has to be formatted and thus all content has to be re-cached, causing a waste of resources. The method realizes batch deletion of cached content in the CDN server with customized deletion conditions.

Example Embodiment V

Figure 6:
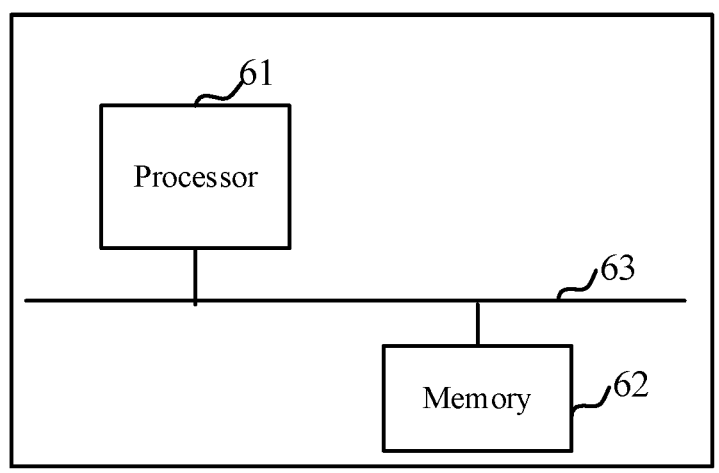
FIG. 6 is a schematic diagram of a batch deletion device for cached resources in example embodiment V of the present disclosure.

This embodiment is intended to at least solve the following problems to a certain extent: in some cases, a CDN server constructed based on NGINX supports only a narrow range of content deletion functions and does not support timely batch deletion of content with some common characteristics, and consequently, efficiency is extremely low when batch deletion is required; and in some cases, if a platform includes sensitive or unsafe resources, a server disk has to be formatted and thus all content has to be re-cached, causing a waste of resources. This embodiment provides a batch deletion device for cached resources, as shown in FIG. 6, including a processor 61, a memory 62, and a communication bus 63, where the communication bus is configured to connect the processor and the memory; and the processor is configured to execute one or more computer programs stored in the memory to implement at least one step in the batch deletion method for cached resources in the foregoing example embodiment I, example embodiment II, and example embodiment III.

This embodiment further provides a computer-readable storage medium that includes a volatile or non-volatile, removable or non-removable medium implemented in any method or technology for storing information, such as computer-readable instructions, data structures, computer program modules, or other data. The computer-readable storage medium includes, but is not limited to, random access memory (RAM), read-only memory (ROM), electrically erasable programmable read-only memory (EEPROM), flash memory or other memory technologies, compact disc read-only memory (CD-ROM), digital versatile disc (DVD) or other optical disc storage, cassettes, magnetic tapes, magnetic disc storage or other magnetic storage devices, or any other media that can be configured to store desired information and can be accessed by computers.

The computer-readable storage medium in this embodiment may be configured to store one or more computer programs executable by one or more processors to implement at least one step in the batch deletion method for cached resources in the foregoing example embodiment I, example embodiment II, and example embodiment III.

This embodiment further provides a computer program (or computer software) which may be distributed on a computer-readable medium and may be executed by a computing device to implement at least one step in the batch deletion method for cached resources in the foregoing example embodiment I, example embodiment II, and example embodiment III. and in some cases, at least one step illustrated or described may be performed in an order different from that described in the above embodiments.

This embodiment further provides a computer program product, including a computer-readable device which stores any of the computer programs as illustrated above. In this embodiment, the computer-readable device may include the computer-readable storage medium as illustrated above.

The present disclosure has the following beneficial effects:

According to the batch deletion method, apparatus, and device for cached resources, and a computer-readable storage medium provided in the embodiments of the present disclosure, keywords are added to content identifiers of cached content and the content identifiers are saved separately; when the cached resources need to be deleted, the content identifiers meeting at least one condition can be found through a keyword-based query, and storage paths of the corresponding cached resources can be determined according to the content identifiers; and finally, the located cached resources are deleted one by one. In some implementations, technical effects include but are not limited to batch deletion of cached content in the CDN server with customized deletion conditions.

As can be seen, it should be understood by those having ordinary skill in the art that all or some of the steps in the methods disclosed above, functional modules/units in the systems and devices disclosed above may be implemented as software (which may be implemented by computer program code executable by a computing device), firmware, hardware, and appropriate combinations thereof. In the hardware implementation, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processing unit, a digital signal processor or a microprocessor, or as hardware, or as an integrated circuit, such as an application specific integrated circuit.

Furthermore, it is well known to those having ordinary skill in the art that communication media typically contain computer-readable instructions, data structures, computer program modules or other data in a modulated data signal such as a carrier wave or other transmission mechanism, and may include any information delivery media. Therefore, the present disclosure is not limited to any particular combination of hardware and software.

The foregoing is a further detailed description of the embodiments the present disclosure in conjunction with particular implementations, and specific implementations of the present disclosure should not be construed as being limited to the description. For those having ordinary skill in the art to which the present disclosure pertains, without departing from the concept of the present disclosure, several simple deductions or substitutions can be made, which should be regarded as falling within the scope of the present disclosure.

The invention claimed is:

1. A batch deletion method for cached resources, which is applied to a content delivery network (CDN) server, the method comprising:
    adding keywords to content identifiers which correspond to cached resources;
    saving the content identifiers with the keywords separately from the cached resources;
    finding, through a keyword-based query, content identifiers meeting at least one condition;
    locating storage paths of cached resources by using the content identifiers meeting the at least one condition; and
    deleting the located cached resources one by one from the CDN server;
    wherein, the method further comprises,
    calculating a message digest (MD) 5 value by using the content identifiers, and planning paths of the cached resources according to the MD5 value;
    wherein each content identifier further comprises a unique identifier of a respective cached resource;
    each content identifier at least comprises following key words comprising, cpid, which represents a content provider (CP); domain, which represents a domain name of the CP; column, which represents a column; time, which represent a resource launch time; filekey, which represents a unique identifier of the cached resource; alarm, which represents a risk level of a source website for the resource; hotrate, which represents popularity of the resource; and
    calculating a message digest (MD) 5 value by using the content identifiers, and planning paths of the cached resources according to the MD5 value comprises,
    calculating the MD5 value by using the content identifier from which the key words of alarm and hotrate are removed, and planning the path of the cached resource according to the MD5 value calculated with the key words of alarm and hotrate removed.

2. The batch deletion method for cached resources of claim 1, before finding, through a keyword-based query, content identifiers meeting at least one condition, the method further comprising obtaining keyword information.

3. A non-transitory computer-readable storage medium storing at least one computer program, wherein the at least one computer program is executable by at least one processor to implement the batch deletion method for cached resources of claim 2.

4. The batch deletion method for cached resources of claim 1, wherein classification rules for the content identifiers are divided depending on the keywords into static classification and dynamic classification.

5. The batch deletion method for cached resources of claim 4, wherein the static classification refers to classification performed according to fixed keywords in the content identifiers for the cached resources.

6. A non-transitory computer-readable storage medium storing at least one computer program, wherein the at least one computer program is executable by at least one processor to implement the batch deletion method for cached resources of claim 5.

7. The batch deletion method for cached resources of claim 4, wherein the dynamic classification refers to classification performed according to dynamically changeable keywords in the content identifiers for the cached resources.

8. A non-transitory computer-readable storage medium storing at least one computer program, wherein the at least one computer program is executable by at least one processor to implement the batch deletion method for cached resources of claim 7.

9. A non-transitory computer-readable storage medium storing at least one computer program, wherein the at least one computer program is executable by at least one processor to implement the batch deletion method for cached resources of claim 4.

10. The batch deletion method for cached resources of claim 1, after deleting the located cached resources one by one, the method further comprising deleting content identifiers which correspond to the deleted cached resources.

11. A non-transitory computer-readable storage medium storing at least one computer program, wherein the at least one computer program is executable by at least one processor to implement the batch deletion method for cached resources of claim 10.

12. A non-transitory computer-readable storage medium storing at least one computer program, wherein the at least one computer program is executable by at least one processor to implement the batch deletion method for cached resources of claim 1.

13. A batch deletion device for cached resources, comprising a processor, a memory, and a communication bus, wherein:

the communication bus is configured to connect a first processor and a first memory; and the processor is configured to execute at least one computer program stored in the memory to implement a batch deletion method for cached resources, which is applied to a content delivery network (CDN) server, the method comprising:

adding keywords to content identifiers which correspond to cached resources;

saving the content identifiers with the keywords separately from the cached resources;

finding, through a keyword-based query, content identifiers meeting at least one condition;

locating storage paths of cached resources by using the content identifiers meeting the at least one condition; and deleting the located cached resources one by one from the CDN server;

wherein, the method further comprises, calculating a message digest (MD) 5 value by using the content identifiers, and planning paths of the cached resources according to the MD5 value;

wherein each content identifier further comprises a unique identifier of a respective cached resource;

each content identifier at least comprises following key words comprising, cpid, which represents a content provider (CP); domain, which represents a domain name of the CP; column, which represents a column; time, which represent a resource launch time; filekey, which represents a unique identifier of the cached resource; alarm, which represents a risk level of a source website for the resource; hotrate, which represents popularity of the resource; and calculating a message digest (MD) 5 value by using the content identifiers, and planning paths of the cached resources according to the MD5 value comprises, calculating the MD5 value by using the content identifier from which the key words of alarm and hotrate are removed, and planning the path of the cached resource according to the MD5 value calculated with the key words of alarm and hotrate removed.

14. The batch deletion method for cached resources of claim 1, wherein classification rules for the content identifiers are divided depending on the keywords into static classification and dynamic classification.

* * * * *